United States Patent [19]

Caruana et al.

[11] Patent Number: 5,132,502

[45] Date of Patent: Jul. 21, 1992

[54] AUTOMATED APPARATUS AND PROCESS FOR TACKING SMALL PLATES ON TURBOJECT ENGINE BLADES

[75] Inventors: Charles M. Caruana, Levallois Perret; Patrick Laboubee, Franconville; Jean-Jacques M. Roussel, Argenteuil, all of France

[73] Assignee: Societe Nationale d'Etude et de Construction de Moteurs d'Aviation S.N.E.C.M.A., Paris, France

[21] Appl. No.: 684,278

[22] Filed: Apr. 12, 1991

[30] Foreign Application Priority Data

Apr. 25, 1990 [FR] France ................................ 90 05248

[51] Int. Cl.$^5$ .................... B23K 11/36; B23K 37/047
[52] U.S. Cl. .................... 219/117.1; 219/158; 219/159; 228/49.1
[58] Field of Search .................... 219/117.1, 158, 159, 219/86.8, 69.17; 269/37, 56, 58; 228/6.1, 49.1, 49.2

[56] References Cited

U.S. PATENT DOCUMENTS

| 911,222 | 2/1909 | Ferranti | 219/159 |
| 3,566,068 | 2/1971 | Bruner et al. | 219/159 |
| 4,509,238 | 4/1985 | Lee et al. | 219/69.17 |

FOREIGN PATENT DOCUMENTS

| 57-9587 | 1/1982 | Japan | 219/86.8 |
| 63-299867 | 12/1988 | Japan | 219/86.8 |

Primary Examiner—Geoffrey S. Evans
Attorney, Agent, or Firm—Oblon, Spivak, McClelland, Maier & Neustadt

[57] ABSTRACT

An apparatus for the automated tacking of small wear plates to the active faces of a shoulder or fin of a turboshaft engine blade which includes a manipulator for moving a blade from a station having a calibrating device onto a welding jig having means for supporting and holding the blade in position, a mechanism for removing a small plate from a magazine of such plates and transferring it into position on one of the active faces of the blade shoulder or fin, an earth electrode for contacting the blade, and a welding electrode for tack welding the plate to the face of the blade shouder. The welding jig is rotatable through 180° to move the blade into a second tacking position and a mechanism is provided for turning every other small plate removed from the magazines through 180° so that it is transferred into the second tacking position for being tack welded to the other active face of the blade shoulder. Operation of the apparatus is controlled automatically by a suitable control device.

3 Claims, 4 Drawing Sheets

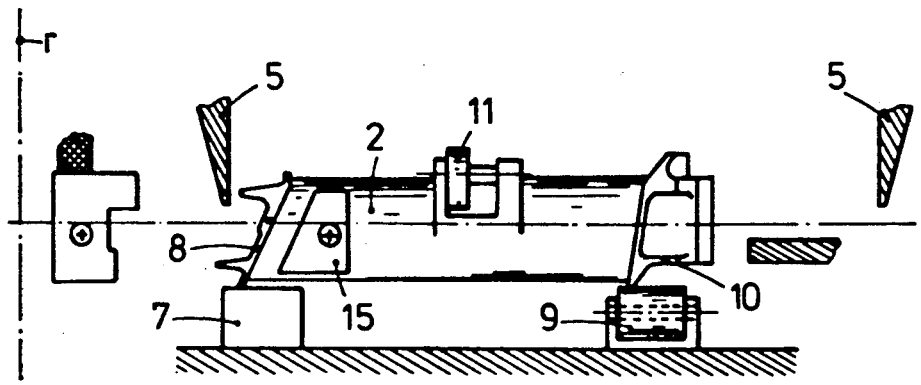
FIG:2
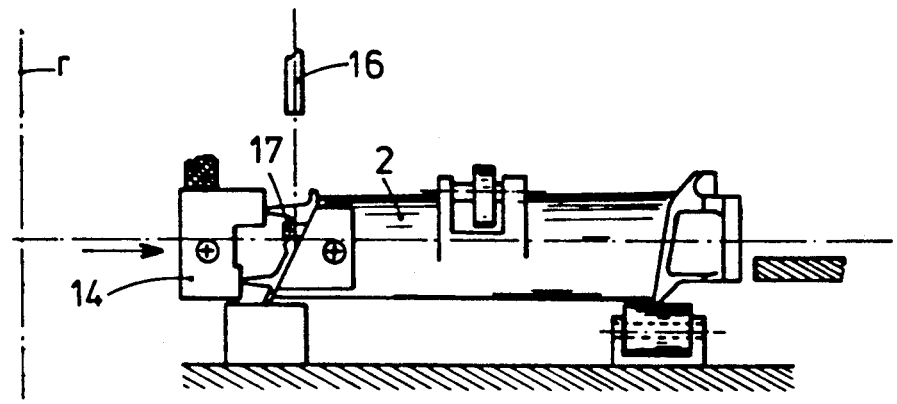
FIG:3
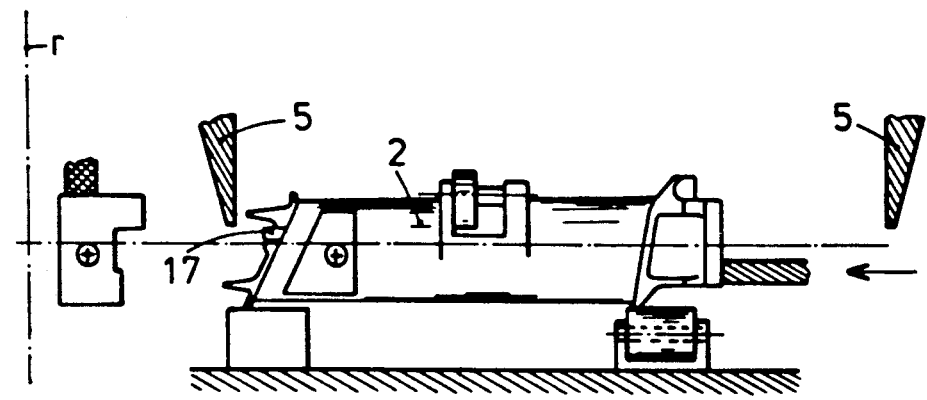
FIG:4

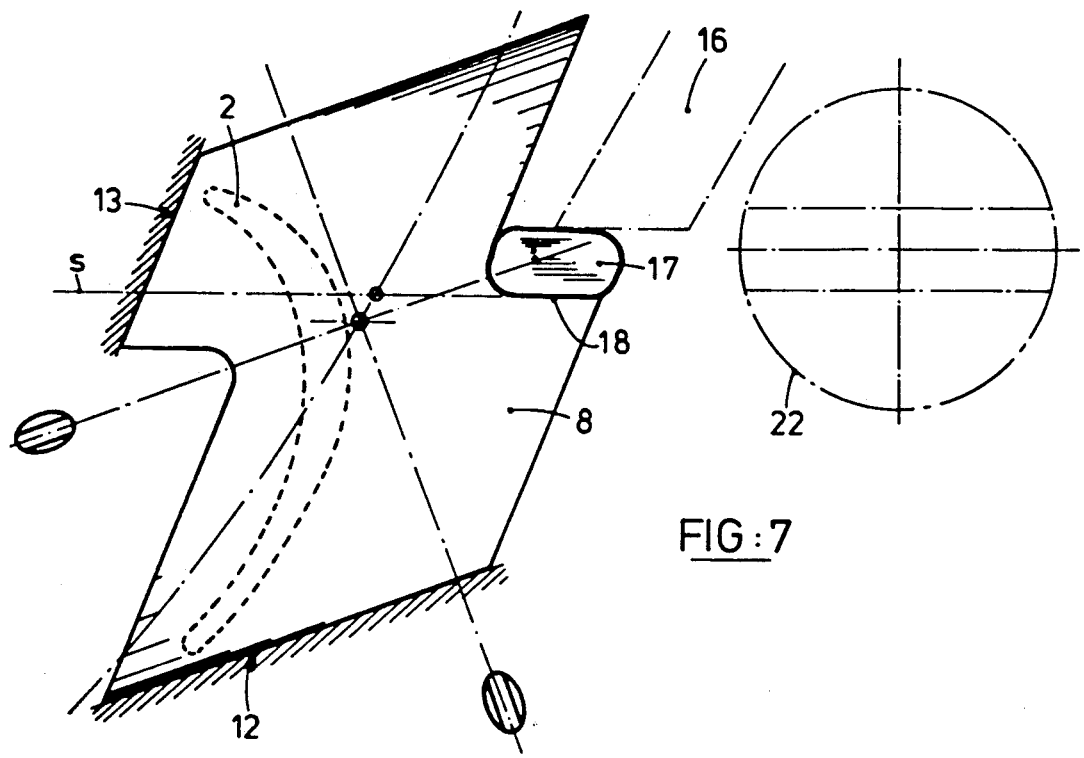
FIG: 7
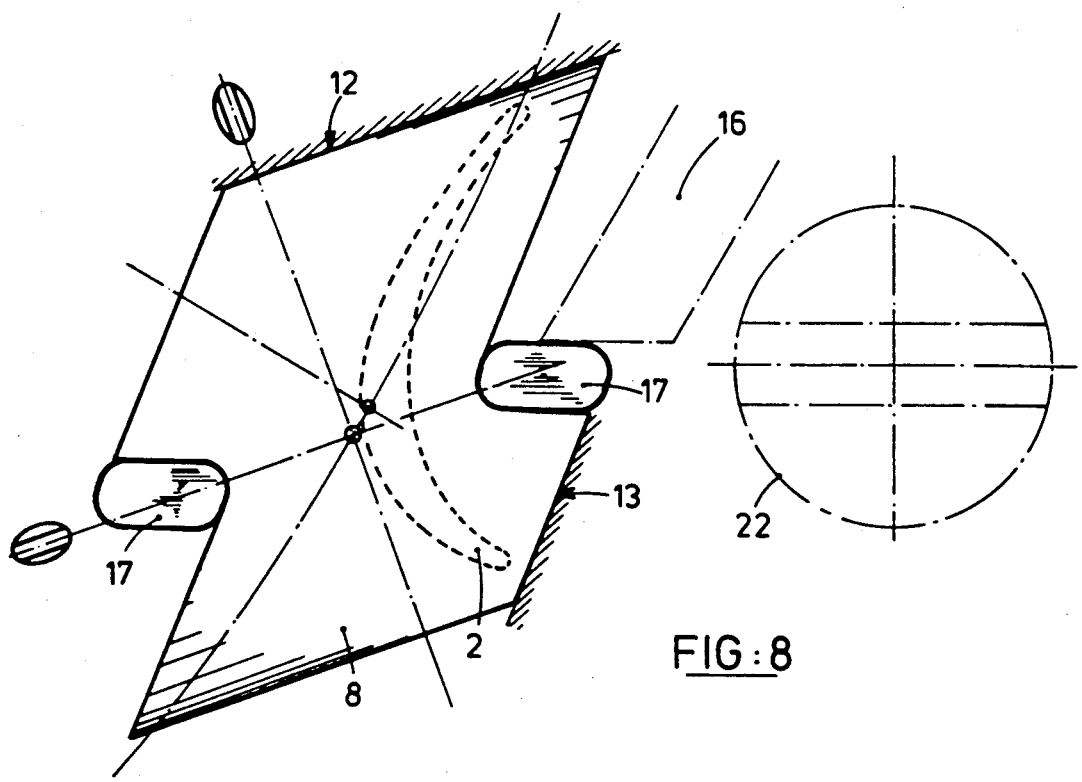
FIG: 8

AUTOMATED APPARATUS AND PROCESS FOR TACKING SMALL PLATES ON TURBOJECT ENGINE BLADES

BACKGROUND OF THE INVENTION

1. Field of the Invention

The present invention relates to an apparatus for achieving a spot-welded connection between small wear plates and a shoulder or fin of a turboshaft engine blade, and also to an automated process using the apparatus.

2. Description of the Prior Art

As is generally known in the construction of turboshaft aero-engines, blades of the engine may have a part, i.e. a shoulder or intermediate shoulder, also termed a fin, intended to limit the deflections which may be caused by vibrations of the blade. In order to prevent premature wear of the facing surfaces of the shoulders or fins of two adjacent blades, it is known to deposit on the faces a coating suited to the particular conditions of operation for each application, and exhibiting good frictional resistance characteristics, in particular. In addition, EP-A-0 140 736 mentions for the same purpose the use of small plates secured by welding on the edges of adjacent sectors of stator blades.

Refining the manufacture of this type of blade has led, in particular, to providing for the mounting of these added members or small plates on the active faces of the blade shoulder by using a known method of the brazing-diffusion type carried out following a thermal cycle in a vacuum treatment furnace. EP-A-0 075 497, for example, describes the technical characteristics and aspects of this operation, particularly where the added member is made of a self-brazable material not requiring the use of a supplementary material at the interface of the elements being joined.

In the manufacture of a blade comprising, in particular, the fitting of added members on the active faces of the shoulder or fin of the blade, problems are posed by the preparation steps for the fixing of these members. The invention is concerned with solving these problems, and particularly at obtaining, through the use of an automated process and appropriately adapted apparatus, good repeatability for satisfactory product quality as a result of correct and precise positioning of the members, as well as a lower manufacturing cost.

SUMMARY OF THE INVENTION

According to the invention, there is provided an apparatus for the automated tacking of small plates on faces of a shoulder or fin of a turboshaft engine blade by resistance welding, comprising a welding electrode; an earth electrode; a welding jig for the blade, said jig comprising a rigid support element for cooperating with two faces of said blade shoulder or fin, a flexible support element for cooperating with two faces of the root of said blade, blade clamping means; a manipulator for moving said blade to and from said welding jig; means for rotating said welding jig and said blade supported thereby through 180°; magazines for containing a plurality of said small plates; a cylinder carrying said magazines; means for removing said small plates one by one from said magazines; means for rotating every other one of said small plates removed from said magazines through 180° about an axis parallel to the generatrices thereof; means for transferring each of said small plates removed from said magazines to a tack welding position on a face of said blade shoulder or fin; and control means for causing said apparatus to carry out automated tacking cycles wherein two of said small plates are welded on said shoulder or fin of each blade.

Also according to the invention there is provided an automated process for tack welding small plates on a shoulder or fin of a blade using the apparatus of the invention, comprising the following steps:

a) identifying the type of blade;

b) using said manipulator to position a blade on said welding jig in a first tacking orientation;

c) supplying a first small plate in a first tacking orientation from said magazines carried by said cylinder;

d) positioning and tacking said first small plate on said blade on said welding jig;

e) rotating said welding jig supporting said blade through 180° to a second tacking orientation;

f) supplying a second small plate as in step c;

g) rotating said second small plate into a second tacking orientation;

h) positioning and tacking said second small plate on said blade on said welding jig in said second tacking orientation; and, i) removing said blade fitted with said small plates from said welding jig using said manipulator.

Other features and advantages of the invention will become apparent from the following description of the preferred embodiments of the invention, with reference to the attached drawings.

BRIEF DESCRIPTION OF THE DRAWINGS

FIGS. 2, 3 and 4 are diagrammatic representations of three steps in the use of the apparatus of FIG. 1, showing respectively the setting of a blade in position, the tacking/welding of a small plate to the blade, and removal of the fitted blade.

FIGS. 7 and 8 show diagrammatically details of the tacking of first and second small plates, respectively, on the shoulder of a blade.

DESCRIPTION OF THE PREFERRED EMBODIMENTS

Figure 1:
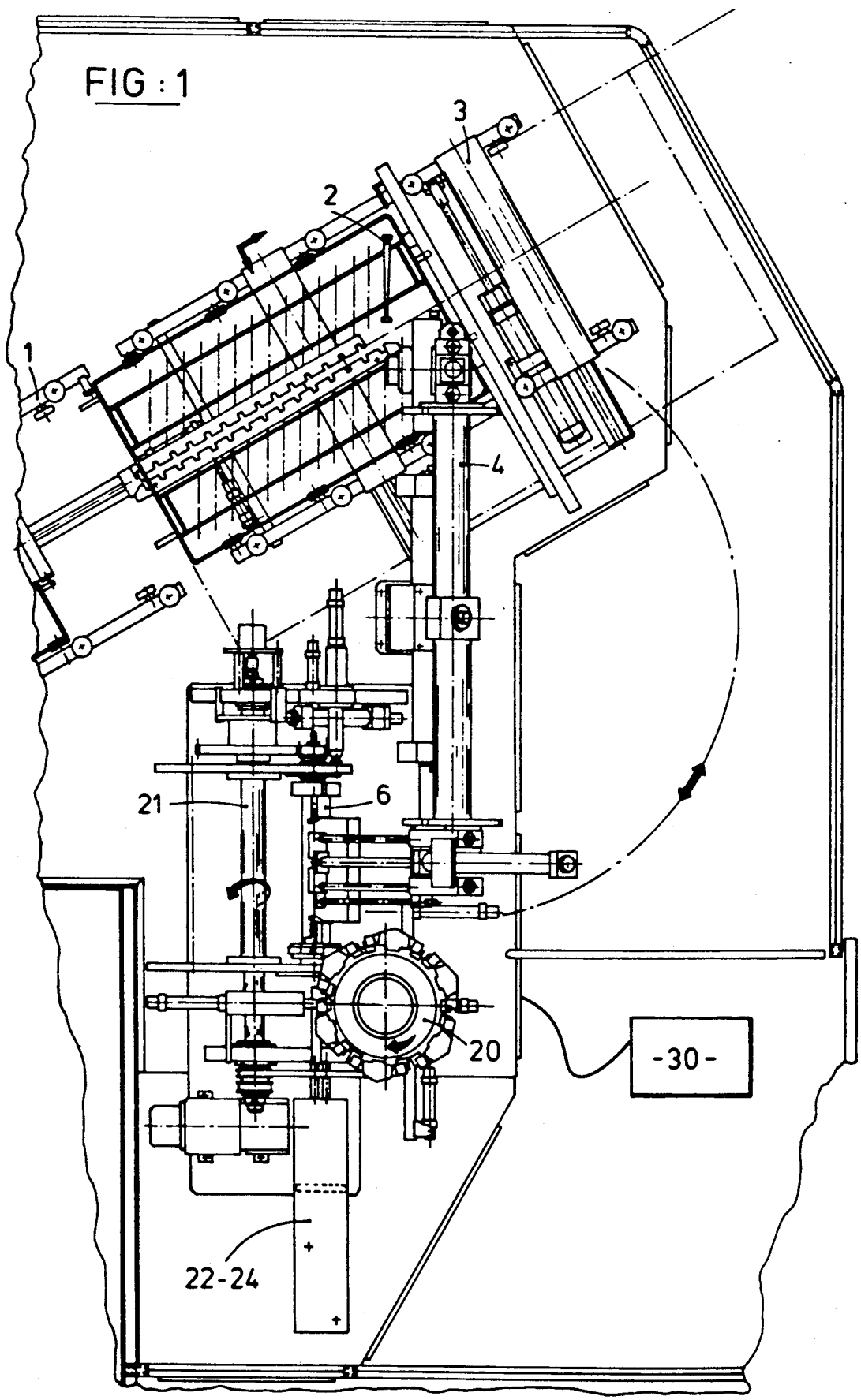
FIG. 1 is a diagrammatic top view of apparatus for tacking small plates on the shoulders of blades in accordance with one embodiment of the invention.

The automated apparatus for tacking/welding small plates on the shoulder of a turboshaft engine blade shown diagrammatically in FIG. 1 may be associated with known equipment for cleaning/washing and drying the components, and only the output station 1 of this equipment is shown in the drawing.

Supply of the blades 2 to the welding station of the apparatus is effected from a station comprising a calibration and step-by-step feed mechanism 3 using a manipulator 4 equipped with gripping clamps 5 as shown diagrammatically in FIGS. 2 and 4. At the welding station the blade 2 is placed on a welding jig 6 which comprises, as shown diagrammatically in FIGS. 2, 3, and 4, a rigid support member 7 for two faces of the blade shoulder 8, a flexible articulated support element 9 for two faces of the blade root 10, and a device 11 for clamping the blade 2, for example by means of springs. In the example shown in the drawings, the blades have a shoulder with paired edges having three faces arranged Z-fashion, as may be seen in FIGS. 7 and 8, the faces 12 and 13 of the shoulder bearing against the tooling of the welding jig.

At the time of welding, an earth electrode 14 is brought into contact with the blade 2, the position reference of the blade 2 being provided by an element 15 bearing on the inner side of the blade shoulder 8, whereas a welding electrode 16 comes to bear on a small plate 17 to be welded on the face 18 of the shoulder 8.

The small plates 17 are supplied in magazines 19 which are arranged on a rotary, magazine-carrying cylinder 20, and the removal of the plates is effected by an actuator 29, a rotary spindle 21 effecting the reversal of every other plate 17.

Figure 5:
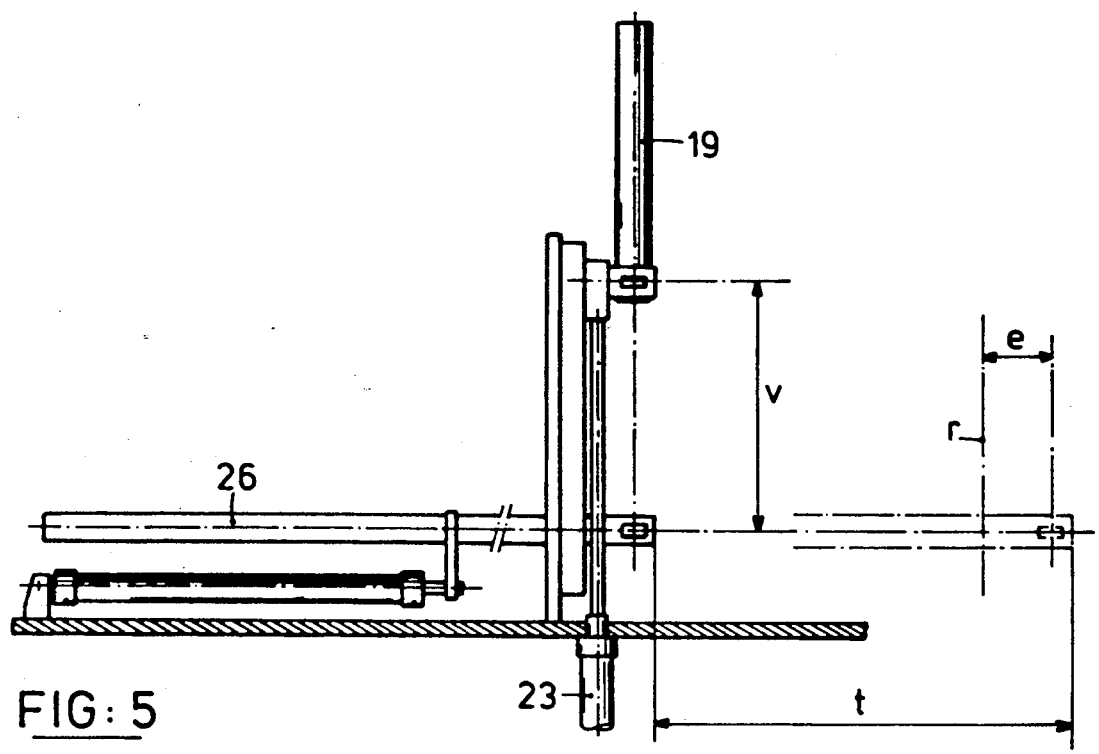
FIGS. 5 and 6 are diagrammatic representations of the parts of the apparatus shown in FIG. 1 which are used for setting the small plates in position.
Figure 6:
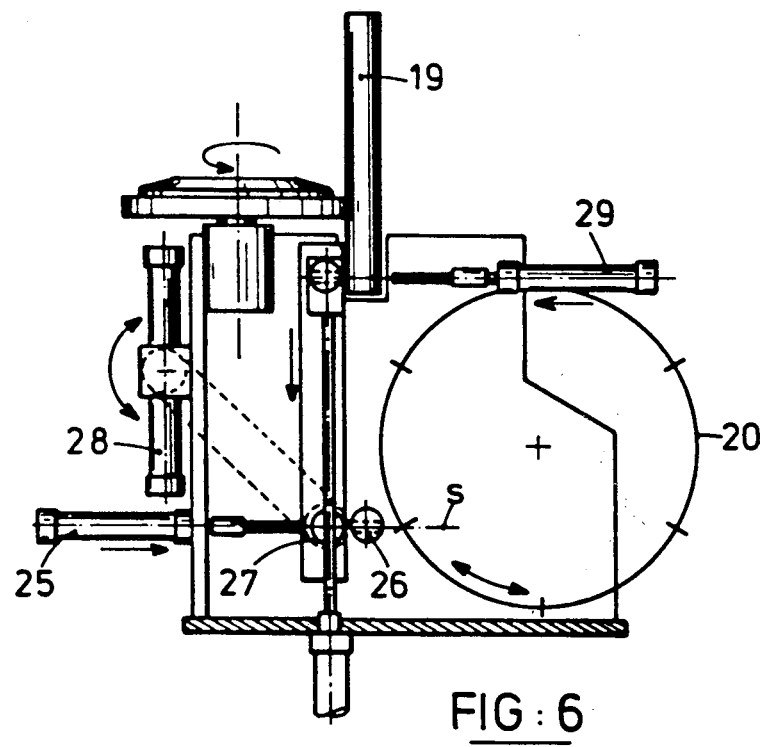

FIGS. 5 and 6 show diagrammatically the components of the mechanism for manipulating the plates 17, comprising a down conveyor 22 having an actuator 23, a transfer conveyor 24 having an actuator 25 and a rod 26, and a reversing station 27 for every other small plate having a rotary actuator 28.

The vertical displacement stroke of the conveyor 22 is represented by symbol v in FIG. 5, and the transfer stroke for the plate 17 is represented by symbol t. The position of the small plate relative to a reference symbol r of the welding jig 6 is represented by symbol e and, symbol s represents the welding reference plane.

The apparatus further comprises control means 30 which is of a type known per se and therefore not described in detail. This control means governs the operation of the automated tacking/welding cycles, successively bringing into action the various parts of the apparatus which have been described with reference to FIGS. 1 to 8.

The apparatus just described enables an additional member or small plate 17 to be firmly fixed accurately on each active face of a blade shoulder 8 by means of spot welds, in order to facilitate manipulation of the blades in the final stage of fitting the small plates on the blade shoulder, notably by a diffusion brazing process in a vacuum treatment furnace.

The automated process for tacking/welding small plates on a blade shoulder using the apparatus as just described includes the following steps:

a) identification of the type of blade;

b) positioning the blade 2 in a first tacking orientation on the welding jig 6 by means of the clamps 5 of the manipulator 4, such as diagrammatically shown in FIG. 2;

c) supplying a first small plate 17 in a first tacking orientation from a magazine 19 situated on the cylinder 20;

d) positioning and tacking the first small plate 17, as diagrammatically shown in FIGS. 3 and 7;

e) rotating the welding jig 6 supporting the blade 2 through 180° to a second tacking orientation;

f) supplying a second small plate 17 as in previous step c;

g) rotating the second small plate 17 to a second tacking orientation h) positioning and tacking the second small plate 17, as shown diagrammatically in FIG. 8; and i) returning the blade 2 fitted with a small plate 17 on each active face of the blade shoulder by means of the clamps 5 of the manipulator 4, such as shown diagrammatically in FIG. 4.

Automating the apparatus in the manner described permits precise positioning of the blade and the small plates to be fitted thereto, with absorption of geometrical differences of the parts arising from preceding manufacturing operations, both blade machining and plate manufacture, particularly by a known reaction sintering or self-brazing process.

Obviously, numerous modifications and variations of the present invention are possible in light of the above teachings. It is therefore to be understood that within the scope of the appended claims, the invention may be practiced otherwise than as specifically described herein.

We claim:

1. Apparatus for the automated tacking of small plates on faces of one of a shoulder and fin of a turboshaft engine blade by resistance welding, comprising:

a welding electrode;

an earth electrode;

a welding jig for the blade, said jig comprising
a rigid support element for cooperating with two faces of said blade shoulder or fin,
a flexible support element for cooperating with two faces of the root of said blade, and
blade clamping means;

a manipulator for moving said blade to and from said welding jig;

means for rotating said welding jig and said blade supported thereby through 180°;

a plurality of magazines for containing a plurality of said small plates;

a cylinder carrying said magazines;

means for removing said small plates one by one from said magazines;

means for rotating every other one of said small plates removed from said magazines through 180° about an axis parallel to the generatrices thereof;

means for transferring each of said small plates removed from said magazines to a tack welding position on a face of said blade shoulder or fin; and control means for causing said apparatus to carry out automated tacking cycles wherein two of said small plates are welded on said one of said shoulder and fin of each blade.

2. Apparatus according to claim 1, wherein said one of said shoulder and fin of said blade has opposite Z-shaped edges, and said small plates are tack welded to the intermediate face of each of said Z-shaped edges.

3. An automated process for tack welding small plates on one of a shoulder and fin of a blade, comprising the following steps:

a) identifying the type of blade;

b) using a manipulator to position a blade on a welding jig in a first tacking orientation;

c) supplying a first small plate in a first tacking orientation from magazines carried by a cylinder;

d) positioning and tacking said first small plate on said blade on said welding jig;

3) rotating said welding jig supporting said blade through 180° to a second tacking orientation;

f) supplying a second small plate as in step c;

g) rotating said second plate into a second tacking orientation;

h) positioning and tacking said second small plate on said blade on said welding jig in said second tacking orientation; and, i) removing said blade fitted with said small plates from said welding jig using said manipulator.

* * * * *

UNITED STATES PATENT AND TRADEMARK OFFICE
CERTIFICATE OF CORRECTION

PATENT NO. : 5,132,502
DATED : 7/21/92
INVENTOR(S) : CHARLES M. CARUANA ET AL

It is certified that error appears in the above-identified patent and that said Letters Patent is hereby corrected as shown below:

IN THE ABSTRACT, line 6, delete "means" and insert --mechanism--.

Column 1, line 2, please change "TURBOJECT" to --TURBOJET--.

Column 2, lines 31 and 32, after "DRAWINGS", delete "FIG." and begin new paragraph with --FIG--.

Column 3, line 29, please delete "per se" and insert as italics --per se--.

Column 4, line 58, please delete "3)" and insert --e)--.

Title page at [54], last line of title, please delete "TURBOJECT" and insert --TURBOJET--.

Signed and Sealed this

Fourteenth Day of September, 1993

Attest:

BRUCE LEHMAN

*Attesting Officer*

*Commissioner of Patents and Trademarks*